Figure 5:
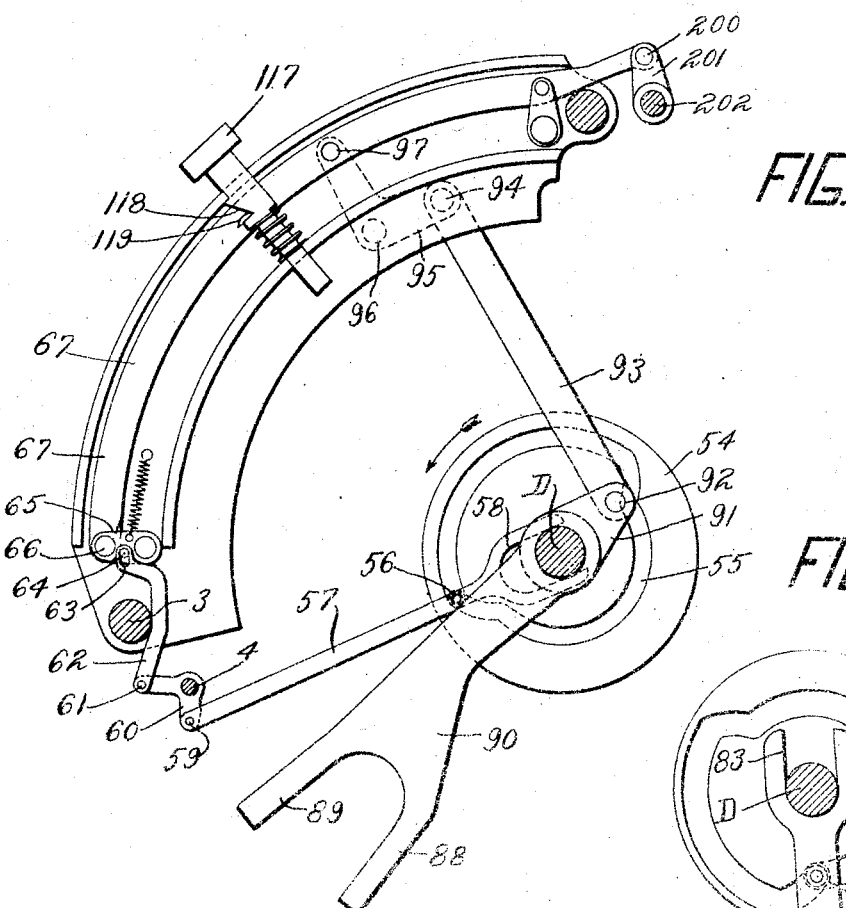

H. A. MARTIN.
CASH REGISTER.
APPLICATION FILED AUG. 23, 1912.
1,189,278.
Patented July 4, 1916.
4 SHEETS—SHEET 1.
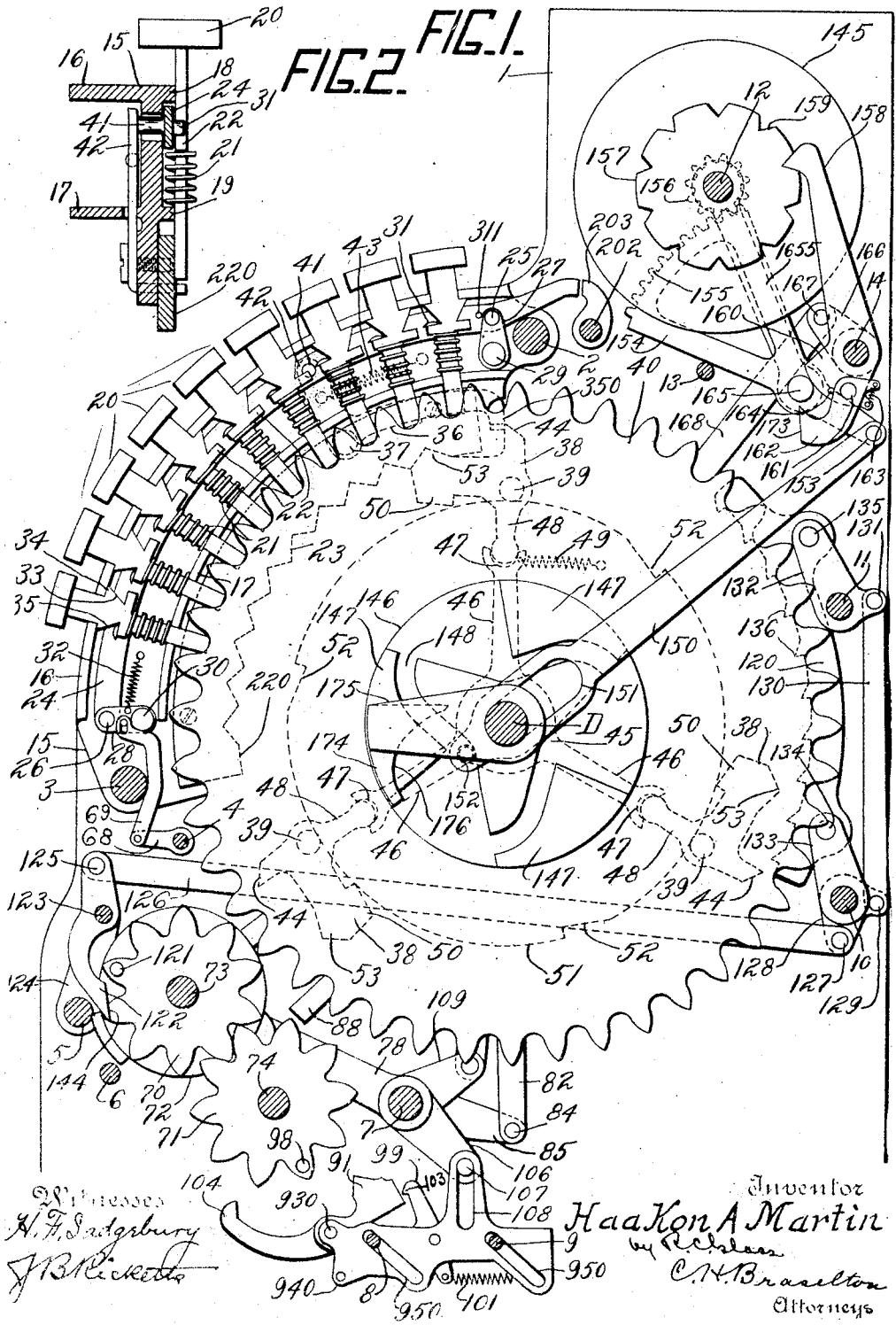
Inventor
Haakon A. Martin

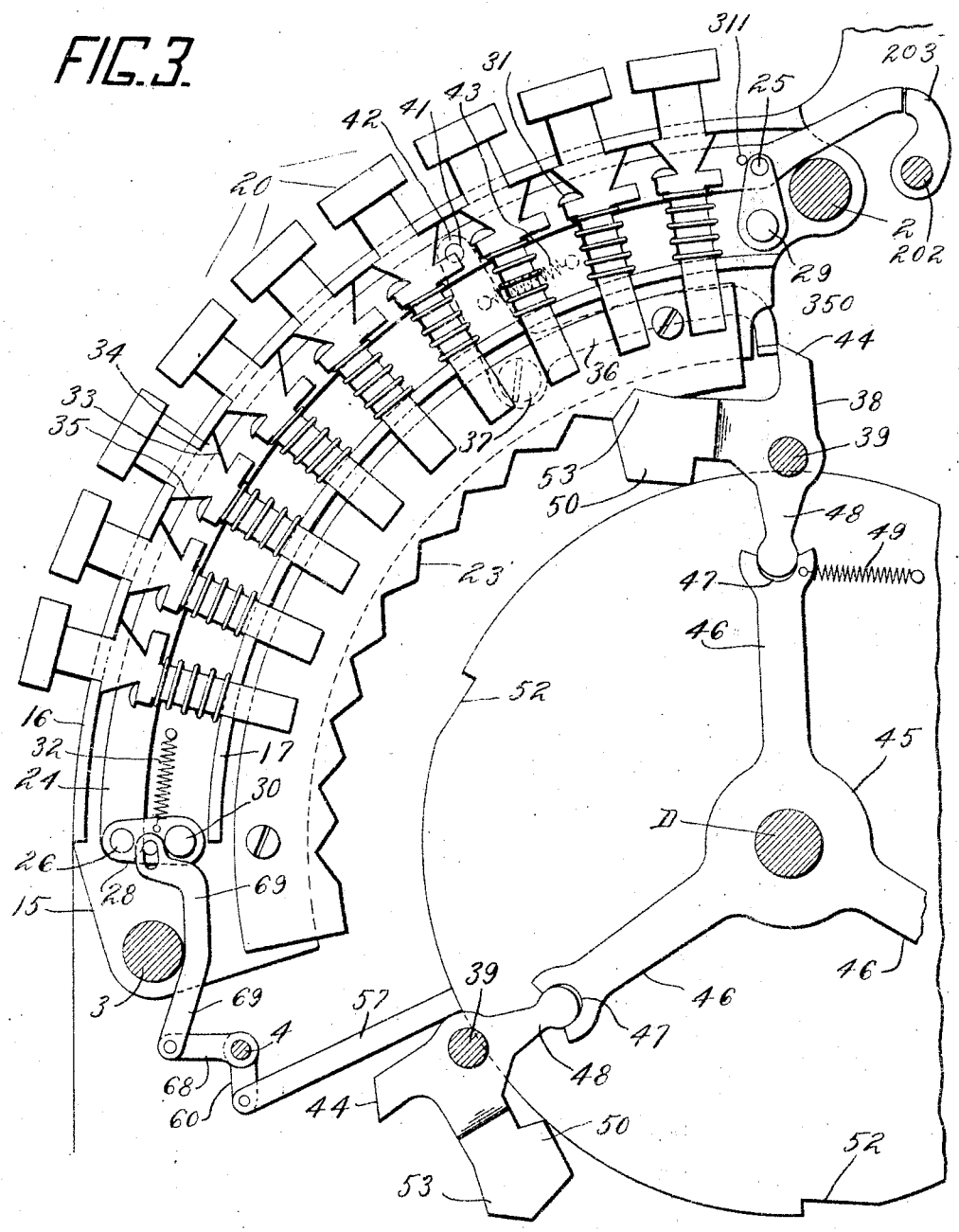

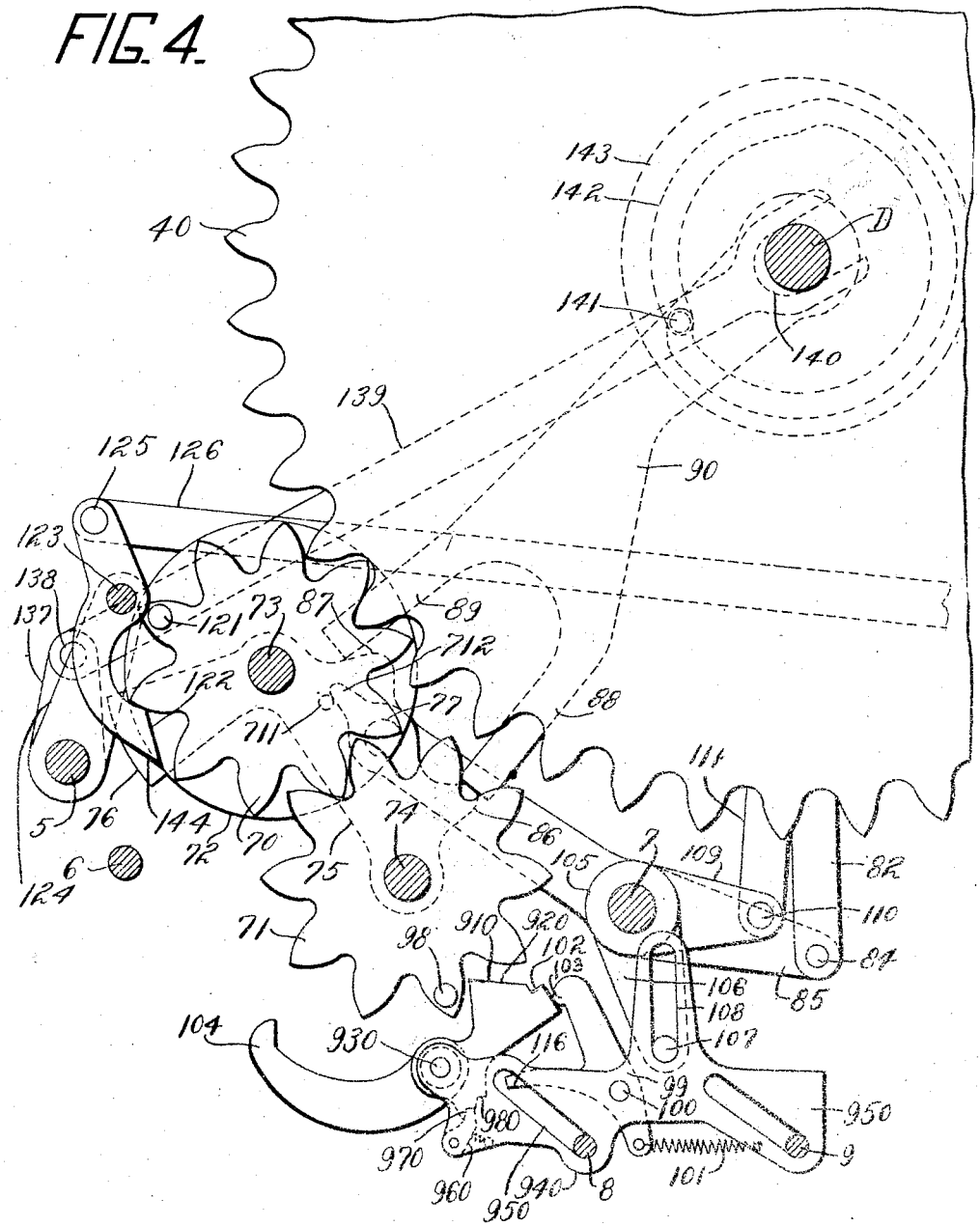

H. A. MARTIN.
CASH REGISTER.
APPLICATION FILED AUG. 23, 1912.

1,189,278.

Patented July 4, 1916.
4 SHEETS—SHEET 4.

Witnesses
H. F. Sadgebury
J. B. Ricketts

Inventor
Haakon A. Martin
by R. Osborn
C. H. Braselton
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,189,278.  Specification of Letters Patent.  Patented July 4, 1916.

Application filed August 23, 1912. Serial No. 716,578.

*To all whom it may concern:*

Be it known that I, HAAKON A. MARTIN, a citizen of the United States, residing at Dayton, in the county of Montgomery and State of Ohio, have invented certain new and useful Improvements in Cash-Registers, of which I declare the following to be a full, clear, and exact description.

This invention relates generally to accounting machines and the particular embodiment shown and described to that class known as cash registers which employ indicators for indicating the amounts entered in the accounting mechanism.

The objects of the invention include the provision of an improved form of a differential mechanism in which the actuators always move in the same direction, as distinguished from the well known oscillatory or reciprocatory types. In the particular embodiment shown the actuators of the differential mechanism have constant extents of movements at all operations, but their movements are interrupted temporarily at various points to control their extents of movement which take place while the accounting mechanism is in condition for operation by them.

The objects also include the provision of improved indicator actuating mechanism for actuating the indicators from the novel differential mechanism. The indicator actuating mechanism includes floating indicator actuating segments, and cams rigid with the actuators of the differential mechanism to differentially control the movements of the same and thus the setting of the indicators. This mechanism is not claimed herein, however, but forms the subject matter of a divisional application Serial No. 38,639 filed July 8, 1915.

Another object of the invention is to construct counter mechanism and transfer mechanism therefor, well adapted for use with the novel differential mechanism for actuation thereby and also for controlling the movement of the differential mechanism in turn to zero or total taking operations. The counter includes two sets of continuously meshed pinions, one bearing reading characters if desired, and either of which may be brought into engagement with the actuators for rotation thereby, the direction of movement of the pinion by the actuators for turn to zero or item entering operations being dependent upon the set of pinions in mesh with the actuators, but in both operations the actuators of the differential mechanism move in the same direction. Corresponding pinions of the two sets are always in mesh and when the pinions of one set are in engagement with the actuators for item entering operations those of the other are disengaged from the actuators and are in coöperative relationship with transfer mechanism. While the pinions of the other set are engaged with the actuators for turn to zero operations those of the one are disengaged from the actuators and rotate in proximity to levers adapted to be operated by the return to zero of the pinions of the one to throw in stops for the actuators. The transfer mechanism includes plates mounted for sliding movement and which carry pawls the tails of which are positioned behind teeth of the next higher pinions and when stripped by their corresponding pinions passing from "nine" to "zero" positions. The plates are then moved to effect additional steps of movement of the pinions in the paths of tripped pawls and to restore the pawls to untripped positions after transfers have been effected.

Still another object of the invention is to provide locking detents for the keys which serve not only to lock the keys in depressed position, but the unlocking movement of which detents serve also to positively restore depressed keys.

With these and incidental objects in view the invention consists in certain novel features of construction and combinations of parts, the essential elements of which are set forth in the appended claims, and a preferred form of embodiment of which is hereinafter described with reference to the drawings which accompany and form part of this specification.

Figure 7:
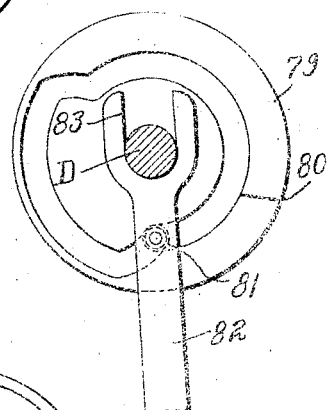
Figure 6:
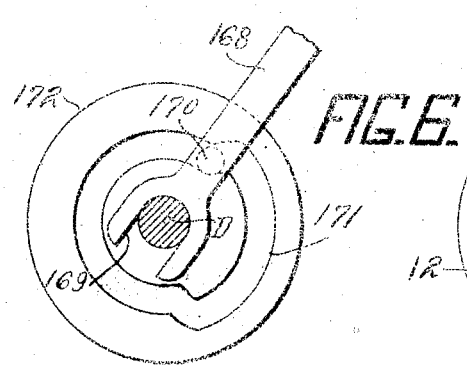
Figure 8:
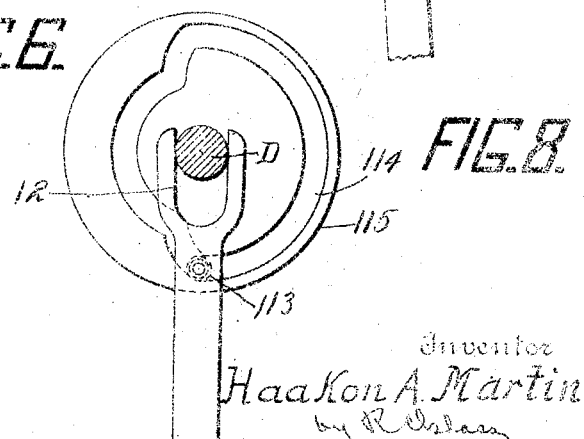

Figure 1 represents a sectional view of the machine taken at the side and looking in the direction, of corresponding units of the differential, indicating, totalizer, and transfer mechanisms. Fig. 2 is a section of the keyboard taken at the position of the fourth key from the top but with this key omitted. Fig. 3 is an enlarged view of one of the banks of keys and some of the coöperating parts of the operating mechanism. Fig. 4 is an enlarged view showing sections of the counter transfer and turn to zero mechanism and the coöperating actuator. Fig. 5 shows the turn to zero key and the mechanism by which it controls turn to zero operation of the machine. Figs. 6, 7 and 8 illustrate respectively the indicator alining cam, the counter frame moving cam, and one of the transfer actuating cams.

The machine as disclosed is provided with but one totalizer, the entering of amounts in which is accompanied by corresponding indication at the top of the machine. As shown it is not provided with printing mechanism but this can easily be supplied so that the machine will print as well as indicate. In taking a total by turning the counter wheels to zero the amount originally on the wheels is set up on the indicator from which the total may be read.

*Differential mechanism.*—In the drawings, 1 indicates one of the two end frames of the machine between both of which extend longitudinal shafts 2 to 14 and the drive shaft D. Shafts 2 and 3 support, respectively, the upper and lower ends of the key bank frames each of which comprises a main member 15 having wide lateral projections 16 and 17 on one side and shorter ones 18 and 19 (Fig. 2) on the other. Bearing against the projections 18 and 19 and held thereagainst by the adjacent key bank to the right, or in case of the right hand key bank by a plate rigid with the machine frame, are the keys 20 normally elevated by springs 21 engaging beneath shoulders 22 of the keys and above the projections 19 of the key bank frames. The lower ends of these keys project alongside plates 220 secured to one side of the lower portion of the key bank frames 15, and having notches 23, as shown in Fig. 1.

Just beneath the projections 18 of the key bank frames there are detent plates 24 pivoted at their upper and lower ends at 25 and 26 respectively to corresponding arms 27 and 28 loosely pivoted at 29 and 30 respectively to the key bank frames. By this means of support upward and downward movement of the detent plates 24 is permitted, these plates carrying projections 31, one for each key of the bank, and a pin 311 for also coöperating with the uppermost key. The detent plate is normally held by a spring 32, connecting with the lower arm 28 and the key bank frame, in raised position with the projections 31 in engagement with the under side of their corresponding keys, the latter having on their upper and lower sides notches 33 with projections 34 between them and the forward ends of the keys. When a key is depressed incline 35 of its lower notch 33 by engagement with the corresponding pin 31 of the detent plate forces the latter downwardly to allow full depression of the key and the lower projection 34 of the key depressed to pass beyond the projection 31 of the detent plate and permit spring 32 of the latter to draw its plate upwardly and engage the projection 31 in front of projection 34 on the under side of the depressed key and retain the latter in depressed position. The depression of any key in the bank has the same effect upon the detent plate which plate, after the key is fully depressed, serves to hold it in depressed position.

The ends of depressed keys serve to limit the effective movement of the actuators of the differential mechanism and to thus control the differential actuation of the counter and the adjustment of the indicators. To this end the downward movement of the detent plates 24, caused by the depression of keys in its bank, is used to withdraw projections 350 on bell cranks 36 pivoted at 37 to the key bank frames 15, from the path of dogs 38 pivoted at 39 to the actuators 40. The detent plates 24 connect by pins 41 with forward arms 42 of these bell cranks 36 and through these connections the lowering of the detent plates as above described serves to rock the bell cranks about their pivots 37 against the tension of springs 43 connected to the arms 42 and the key bank frames, and raise the rear arms of these bell cranks so that their projections 350 will clear projections 44 of the dogs 38 and permit the latter and the actuators which carry them to move about the drive shaft D in a counter-clockwise direction. In the normal condition of the machine the projections 350 are in the paths of the dogs 38 of the actuators and prevent movement of the latter and the depression of a key in a bank is necessary before the corresponding actuator may be moved.

Fig. 1 shows the normal position of these parts, in which they stop at the end of operations of the machine. The actuators 40, each of which pivotally carries three dogs 38 separated angularly 120 degrees, are mounted loosely upon the drive shaft D. Also loose upon this shaft at the side of the actuators are spiders 45 having three arms 46 in the ends of which are curved recesses 47 in which are located the curved ends of arms 48 of the pawls 38. Springs 49 connect with one of these arms 46 of each spider and with the actuators adjacent and tend to cause clockwise movement of the spiders relative to their actuators to retain inner portions 50 of the dogs 38 in engagement with the peripheries of disks 51, one adjacent each actuator, and rigid with the drive shaft D, and which have three notches 52 in their peripheries for coöperating with the three dogs 38. The springs 49 through the spiders 46 serve to locate the portions 50 of all the dogs 38 down in the notches 52 whenever the notches come beneath them by rotation of the driving disks 51, one complete rotation of which in a counter-clockwise direction takes place at each operation of the machine, and when the inner portions 50 of these dogs are so located in the notches 52 their outer angular noses 53 will clear the notched plates 220 and permit counter-clockwise movement of the actuator gears 40 with their dogs 38 and spiders 45, by the driving disks 51. The keys when depressed are adapted to project into the paths of projections 44 of the dogs 38 and temporarily limit the counter-clockwise movement of these dogs and their actuator gears caused by the rotation of the driving disks 51, by throwing the noses 53 of the dogs engaged by the keys outwardly into adjacent notches 23 of the plates 220. This outward movement of the forward portions of the dogs is sufficient for their inner portions 50 to clear the notches 52 in which they were located and permit further movement of the disks 51 in a counter-clockwise direction independent of the actuator gears 40 with the inner portions 50 of the dogs riding on the curved peripheries of the driving disks. The disks continue to rotate independent of the actuator gears 40 until those of the notches 52 next behind the ones from which the dogs 38 were disengaged by depressed keys come beneath the inner portions 50 of the dogs 38 adjacent the keys that were depressed, but which in the meantime have been restored to undepressed positions by mechanism hereinafter described. With the keys restored to normal position their ends no longer interfere with the projections 44 of the dogs 38 and these dogs are then pulled down by the springs 49 into the notches 52 of the disks 51 so that the latter will carry their corresponding actuators 40 and dogs 38 to bring those of the latter next behind the projections 350 of the bell cranks 36 which, previously to this, have been restored to normal position with the return of the keys to their normal position, into engagement with these projections 350 which projections serve to swing the engaged pawls 38 and through their spiders their associated ones downwardly to engage the noses 53 of the dogs 38 contacting with the bell cranks 36 into the uppermost notches 23 of the plate 22. This outward swinging of these dogs 38 serves to clear the inner portions 50 of them from the notches 52 in the disks 51 and allow the completion of a rotation of these disks without further effect upon the actuators 40.

As shown in Fig. 1, in the normal condition of the machine the notches 52 of the disks 51 are separated 60 degrees from the coöperating portions 50 of the dogs 38, thus providing for 60 degrees of movement of the driving disks 51 and the drive shaft before any movement is imparted to those of the actuators 40 which may have been freed by depression of keys in their corresponding banks. Seventy-five degrees of movement of the actuators 40 take place before they are stopped by depressed nine keys, and consequently the counter must be in engagement with the actuators 40 from the time these actuators may be picked up by the driving disks 51 at the 60th degree of movement of the latter until they may be left by the driving disks at the 135th degree of movement, when the dogs 38 and actuators 40 would be stopped by depressed nine keys. This is provided for by the cam shown in Fig. 7 which controls the rocking in and out of the counter, and from which it will appear that upon the rotation of the cam in the direction of the arrow (Fig. 5), the counter will start rocking into engagement with the actuators at the beginning of the rotation of the drive shaft, consuming about 15 degrees of movement for completing this movement. The counter is held in engagement with the actuators until about 135 degrees of movement of the drive shaft has taken place when it starts to rock out of engagement completing its disengagement from the actuators by the end of 150 degrees of rotation of the drive shaft. From this it will be seen that the counter is in engagement with the actuators throughout the time that any actuator may possibly be connected with its driving disk 51, during the first engagement of these elements any actuator in any operation of the machine being always disengaged from its driving disk after the 135th degree of movement of the latter until the actuators are picked up by their driving disks the second time for movement to normal position. The counter is always disengaged from the actuators before the latter are picked up the second time by their driving disks which could never take place before the counters are completely disengaged from the actuators at the end of 150 degrees of movement of the drive shaft.

Fig. 5 shows a cam 54 rigid with the drive shaft D having a groove 55 in its side in which plays a roller 56 projecting from one side of a link 57 slotted at one end at 58 to engage over and be guided by the drive shaft D and pivotally connected at its other end at 59 to one arm of a bell crank 60 rigid with the shaft 4 above referred to. The other arm of the bell crank pivotally connects at 61 with a link 62 slotted at its upper end at 63 to engage over a pin 64 carried by an arm 65 which supports at 66 the lower end of a detent plate 67 for a turn to zero key in the manner that the lower arms 28 of the amount key banks support their corresponding detent plates 24. The shaft 4 rigidly carries arms 68 connecting with links 69 which in turn connect with the arms 28 of the amount key banks by pin and slot connections similar to the connections between the links 62 and the arms 65 for the turn to zero key bank. The pin and slot connections 63 and 64 permit downward movement of the detent plates 24 and 67 independent of the links 62 and 69, to allow depression of the keys. From the shape of the groove 55 in the side of cam 54 it will be seen that the shaft 4 will be rocked in a counter-clockwise direction at about the 150th degree of movement of the cam 54, the latter rotating in the direction of the arrow shown in Fig. 5. This rocking of the shaft 4 serves to lower all of the links 62 and 69 sufficiently to engage the upper ends of the slots 63 with the pins 64 and lower the detent plates 24 and 67 sufficiently to release any depressed keys and also positively to engage the projections 31 and pins 311 of the detent plates with the inclined projections 34 on the upper side of the keys just below them, if such keys were in depressed position, and positively return such keys to normal position. The shaft 4 and the detent plates for the keys are held in moved position until near the end of the operation of the machine when, due to the shape of the cam groove 55, these parts are restored to the normal position shown in Fig. 5. By this construction restoration of depressed keys is provided for prior to the second picking up of the actuators by the driving disks 51 for returning the former into position for the next operation.

*Counter and transfer mechanism.*—As the actuators for the machine have but one direction of movement, and as it is desired to provide for turning the counter to zero by an operation of the machine, provision is necessarily made for effecting two directions of movement of the counter elements from the single direction of movement of the actuators. To this end the counter pinions proper are always in mesh with corresponding similarly shaped pinions also carried by the counter frame.

70 represents one of the counter pinions and 71 the corresponding pinion always in mesh with it. 72 represents the disks rigid with the counter elements 70 which may have characters from zero to nine printed on their peripheries if so desired. The shafts 73 and 74 respectively carry the counter pinions and disks 72 and the corresponding pinions 71. These shafts are supported at their ends by frames 75 which have inwardly bent flanges 76 at the front for coöperating with the shaft 6 to prevent undue downward movement of the forward portions of the frame. The counter frames 75 are pivoted at 77 to arms 78 rigid with the shaft 7 which is rocked at each operation of the machine by cam 79 shown in Fig. 7 and above referred to. This cam is provided with a groove 80 in one side of which plays a roller 81 projecting from the side of a link 82 slotted at one end at 83 to engage over and be guided by the drive shaft D of the machine, and pivotally connected at its other end at 84 with an arm 85 also rigid with the shaft 7. This rocking of the shaft 7 at each operation of the machine through the arms 78 supporting the counter frame carries the latter toward the actuators at the beginning of an operation of the machine and away from the actuators by the completion of 150 degrees of rotation of the drive shaft.

One of the counter frame pieces 75 is provided on its upper edge with projections 86 and 87 for coöperation respectively with arms 88 and 89 of a forked member 90 loose on the drive shaft. This member 90 is rigid with an arm 91 to which is pivotally connected at 92 one end of a link 93, the opposite end of which is connected at 94 with one arm of a bell crank 95 pivoted at 96 to the frame for the turn to zero key, and the other arm of which is pivoted at 97 to the detent plate 67 for this key bank. In the normal position of the machine the arm 88 of the fork 90 is above the projection 86 of the counter frame so as to limit the movement of the rear side of the frame toward the actuators effected by the rocking of the shaft 7, and the arm 89 of the forked member 90 normally clears the projection 87. Operation of the machine with the forked member 90 in the position as shown in the drawings, by rocking of shaft 7 and upward movement of its arm 78 carries the counter pinions 70 into engagement with the actuator gears 40 because the arm 88 of the member 90, by engaging the projection 86 of the counter frame, limits the upward movement of this rear side of the frame and causes increased movement of the forward side of the frame and the counter pinions 70 to engage the latter with the actuators by reason of the arms 75 being pivoted at 77 between the projections 86 and 87 of the counter frame. This rocking in of the counter pinions 70 occurs prior to the movement of the actuator gears 40 which, when subsequently moved in a counter-clockwise direction as shown in the drawings, effect rotation of the counter pinions 70 in a clockwise direction and to extents proportional to the movement of the actuators taking place while the counter pinions are engaged with them. As the counter wheels are always in engagement with their corresponding pinions 71, the latter will be rotated counter-clockwise to corresponding extents. Pins 711 on the counter frame 75 are just below the ends 712 of the arms 78 and through these pins the arms serve to positively disengage the counter pinions from the actuators as the arms are rocked downwardly for this purpose. This construction permits however the necessary swinging of the counter frame counterclockwise about its pivot 77 for engaging the pinions 71 with the actuators for total taking operations.

Transferring operations between the counter wheels are effected through the pinions 71 which for this purpose carry pins 98 which, as these pinions pass from positions corresponding to the nine positions of the counter wheels to positions corresponding to the zero positions of such wheels in adding operations, engage inclined portions 910 of pawls 920 pivoted intermediate their ends at 930 to plates 940 slotted at 950 for working over stationary shafts 8 and 9 rigid with the machine. Alining pawls 960 carried by the plates coöperate with notches 970 and 980 of the pawls 920 for respectively holding the latter in untripped or tripped positions. Pawls 99 pivoted at 100 to the plates 940 are normally held, by springs 101 connected with their lower ends and with plates 940, with their upper ends in engagement with the upper ends of the corresponding pawls 920. The position of these pawls shown in Fig. 1 is their normal position, while that of Fig. 4 is their adding position, and rotation of the pinions 71 one step in the adding direction from the position shown in the latter figure serves to force rearwardly the upper ends of transfer pawls 920 and sufficient to position notches 102 of the transfer pawls adjacent projections 103 of the pawls 99 so that under the influence of spring 101 projections 103 of the pawls 99 will engage in the notch 102 and retain the transfer pawls 920 in tripped positions. This tripping of the transfer pawls 920 carries their tails 104 upwardly behind one of the teeth of the next higher pinion 71, but not between the teeth of such pinion so as to prevent further movement of the latter.

After the movement of the counter pinions 70 and the pinions 71 effected by the actuator gears 40 is completed and the counter is disengaged from the actuators, the actual transferring operations take place. The transfer plates 940 before the beginning of an operation of the machine are in the position shown in Fig. 1 but at the beginning of an operation they are all simultaneously moved forwardly and upwardly to the position shown in Fig. 4, reaching such moved position after the proper set of the pinions 70 or 71 is engaged with the actuators. It is on the return rearward movement of the plates after the pinions have been moved by the actuators that the transferring operations take place.

The reciprocation of the plates 940 is brought about by a series of two armed sleeves 105, one less in number than the pinions 71, arms 106 of which sleeves have pins 107 working in vertical slots 108 of the corresponding plates 940 and the other arms 109 of which are pivotally connected at 110 to the lower ends of corresponding links 111 slotted at their upper ends at 112 to be engaged over and be guided by the drive shaft D. These links 111 carry rollers 113 projecting from their sides into grooves 114 in the side of corresponding transfer cams 115. The grooves of these cams are of such shape and so related to each other as to cause at the beginning of an operation, the simultaneous lowering of the links 111 and the consequent forward movement of the plates 940 to bring these transfer pawls into coöperative relation with the pinions 71 if the latter are in their item entering position, and to cause, beginning shortly after the 150th degree of movement of the cams, the successive raising from lower to higher denominations of these links and the corresponding downward and rearward movements of their plates 940. This downward and rearward movement of these plates 940 takes place after the counter frame is restored to normal position, and carries along the pawls 920 and those of the pawls which have been previously tripped will have their tails 104 engaged between adjacent teeth of the pinion 71 by the lowering of the pinion 71 to normal position so that the movement of the plates 940 away from the pinions 71 imparts an extra degree of movement to such pinions. It will be noted that when the counter is rocked upwardly for engagement with the actuators for item entering operations the pinions 71 are also carried slightly toward the actuators to engage the projection 86 of the counter frame with the arm 88 of the yoke 90. As the counter frame during this part of its movement rocks about the shaft 7 as an axis the pawls 920 will not affect the pinion 71 because these pawls and their plates 940 are in rearmost position until the pinions are engaged with the actuators. When adding operations are taking place, at which time the transfer pawls 92 are in position to be tripped, the pinions 71 will be slightly elevated from the position shown in Fig. 1 to the position shown in Fig. 4 and when in this slightly elevated position the tripping of the transfer pawls will not carry the tails of the latter in between teeth of the pinions 71 adjacent the ones doing the tripping, but only sufficiently upward so that when the counter frame is lowered from engaging the counter pinions with the actuators the pinion 71 will be carried down to locate the tails 104 of the tripped transfer pawls between adjacent teeth of their coöperative pinions. This leaves the pinions 71 so that they will be actuated one step upon the rearward and downward reciprocation of the plates 940 which then takes place, as above described, and this extra degree of movement given to the pinions 71 will, as the latter are always in mesh with the counter wheels 70, move the desired ones of these counter wheels additional steps to effect transfers.

The rearward and downward movement of the plates 940 is what effects transferring movements of the pinions 71 and the transfer pawls are designed to be restored to normal untripped position near the end of this downward movement of the plates 940. To this end the pawls 99 have forwardly projecting arms 116 projecting across the forward slots 950 and near the end of the rearward movement of these plates the ends of these arms 116 of the pawls 99 are carried against the shaft 8 effecting clockwise rocking of the pawls 99 to free their projection 103 from the notches 102 of the transfer pawls 920. Still further movement of the plates and pawls rearwardly causes the shaft 8 to engage the ends of arms 116 with the rear edges of transfer pawls 920 and positively restore the latter to the normal position shown in Fig. 4 with the alining pawls 960 in engagement with the notches 970 of the transfer pawls. These alining pawls 960, when the transfer pawls are tripped previous to the movement of plates 940, engage notches 980 of the transfer pawls and hold the latter in tripped positions.

*Turn to zero mechanism.*—In the item entering operations just described the counter wheels are rotated in a clockwise direction in the figures by direct engagement with the actuator gears 40, the pinions 71 serving only as parts of transfer mechanisms for the counter pinions. The machine is adapted, however, for turning the counter wheels to zero by an operation of the machine and setting the indicators in correspondence with the extents of rearward movement of the counter wheels in passing to zero positions to indicate the total on the counter at the beginning of the operation. Since the actuator gears 40 are designed for rotation in but one direction, it is necessary in turn to zero operations, in which the counter wheels must move in a reverse direction to that of adding to engage the pinions 71 with the actuator gears instead of the counter pinions 70. The rotation of the actuator gears 40 will when in mesh with the pinions 71 effect clockwise rotation of these pinions and through them, counter-clockwise rotation of the counter pinions 70. The time of rocking of the counter frame is the same in total taking as in item entering operations.

When a total is to be taken the total key 117 (Fig. 5) is depressed, which depression by incline 118 of the key engaging projection 119 of the detent plate 67, moves the latter downwardly to effect through bell crank 95, link 93 and arm 91 on yoke 90, the counter-clockwise swinging of the latter to carry its arm 88 out of alinement with projection 86 and the arm 89 into alinement with projection 87 of the counter frame. Movement of the counter frame toward the actuators with the yoke thus adjusted instead of effecting engagement of the counter pinions 70 with the actuators will effect engagement of the pinions 71 with them, arm 89 of the yoke 90 limiting the movement of the forward portion of the counter frame in such operations instead of the arm 88 limiting the movement of the rear portion of the counter frame as in item entering operations. Rotation of the actuators 40 after the pinions 71 have been engaged with them effects through the clockwise movement of the pinion 71 counter-clockwise movement of the counter pinions 70, and this reverse movement of the counter pinions is adapted to be stopped when the latter reach zero position by projection carrying plates at the rear of the machine, which are thrown in to engage the adjacent dogs 38 and prevent further movement of the latter with the actuators carrying them and through the spiders 46 tilting the dogs 38 adjacent the notched plates 220 to engage the noses 53 of such dogs with the adjacent notches 23 of these plates 220. After the dogs 38 have been engaged with the notched plates 220 in this manner further operation of the machine is identical with that described above in connection with the item entering operations.

It is necessary in total taking operations to disable the zero stops for the actuators, which are normally disabled only by depression of a key in the corresponding amount key bank. This is done by the depression of the total key and to this end the detent plate 67 for the total key projects rearwardly at its upper end and is pivotally connected at 200 with an arm 201 rigid with a shaft 202 extending transversely of the machine. This shaft 202 by this connection is rocked slightly counter-clockwise whenever the detent plate 67 for the total key is lowered by the depression of such key. The shaft 202 carries other arms 203, one for each bank of amount keys, and the detent plates 24 of the amount banks extend rearwardly to engage the forward sides of their corresponding arms 203 on the shaft 202 when the amount detent plates are in normal upward position. When the shaft 202 is rocked forwardly by depression of the total key its arms 203 engage their corresponding detent plates for the amount banks and lower the plates, which being connected to the forward arms of their corresponding bell cranks 36 oscillates these bell cranks to withdraw their projections 35 from in front of the projections 41 of their engaged dogs 38. Depression of keys in the amount banks has no effect upon the total key since the rear ends of the detent plates for the amount banks do not connect with their arms on the shaft 202 but only extend adjacent them on their forward side.

To effect movement of the projection carrying plates 120 to bring their projections into the path of the dogs 38 for stopping the movement of the actuators the counter pinions 70 carry pins 121 which coöperate with the free ends of levers 122 pivoted at 123 to arms 124 rigid with shaft 5. The upper ends of levers 122 are pivoted at 125 to the forward ends of links 126, the rear ends of which are pivoted at 127 to depending arms of sleeves 128 loose on the shaft 10. These sleeves 128 have arms which pivotally connect at 129 with the lower ends of corresponding links 130, the upper ends of which are connected at 131 to the rear arms of bell cranks 132 loose on the shaft 11. The sleeves also have arms 133 and to these arms and the corresponding arms of the bell cranks 132 are pivoted at 134 and 135 respectively the plates 120, each of which as stated above, has a series of projections 136 ten in number, for engaging projections 44 of dogs 38 when these members 120 are moved forwardly to carry the projections 136 into the path of these dogs.

The shaft 5 carrying the arms 124 has an arm 137 pivoted at 138 to the forward end of a link 139, the opposite end of which is slotted at 140 to engage over and be guided by the drive shaft D. A roller 141 projects from the side of the link 139 and into a groove 142 in the side of a cam 143 rigid with the drive shaft. From the shape of the groove 142 the shaft 5 is in all operations of the machine rocked at the beginning of the operation in a clockwise direction and at about 150 degrees of movement of the drive shaft back in a counter-clockwise direction to normal position. While the shaft 5 is in moved position the movement of the actuators 40 will take place and during this time the shaft 5, through arms 124 supporting the levers 122, holds the pivots 123 of the latter rearward sufficiently to locate the lower free ends of the levers 122 rearward in the path of pins 121 on the counter pinions 70 when the latter are raised slightly from the position shown to engage the projection 87 of the counter frame with the arm 89 of the yoke 90, in which raised position the counter pinions stay while the pinions 71 are engaged with the actuators for rotation thereby. The rocking of the shaft 5 at the beginning of the operation of the machine does not effect the notched plate 120 at the rear of the actuators, as it only serves to swing the levers 122 about the pivotal connections 125 with the forward ends of the links 126, unless one of the counter wheels is at zero before the operation of the machine, in which case this clockwise rocking of the shaft will be sufficient to engage the plane surfaces 144 on the free ends of the levers 122 with the adjacent pins 121 of the counter wheels standing at zero before completion of rearward movement of the pivots 123 of the levers by the arms 124. These pins 121 will then limit the rearward movement of the free ends of the levers 122 and cause corresponding rearward movement of the upper end of this lever 122 and its connected links 126 as the rocking of the arms 124 is completed. In such cases, which occur when counter wheels stand at zero, the corresponding sleeves 128 on the shaft 10 will be rocked in counter-clockwise direction to move the plates 120 forward to immediately bring the lowermost projections 136 into the path of adjacent dogs 38 before any movement of the actuators. The latter will subsequently have practically no movement until projections 44 of their rear dogs 38, which at the beginning of an operation of the machine are always in the position shown in the figures, will engage the lowermost projection 136 and be swung thereby outwardly effecting through the spiders 46 similar swinging of the two other dogs of the actuators so as positively to hold the uppermost dogs 38 in the upper notches 23 of the plates 220, and prevent their operative engagement in the notches 52 of the disks 51 for movement thereby.

In cases in which the counter wheels are not at zero at the beginning of an operation of the machine, the clockwise rocking of the shaft 5 at the beginning of an operation serves only to carry the lower free end of the levers 122 into the paths of pins 121 on the counter wheels 70 when the latter are in total taking position, but as the counter wheels are rotated in a counter-clockwise direction from their "one" to "zero" positions, the pins 121 will engage the inclined surfaces 144 of the levers 122 and positively rock these levers clockwise about their pivoted connections 123 with the arms 124 which are then rigid in moved positions. This shifts the corresponding links 126 rearward and oscillates the connected sleeve 128 and through the links 130 the bell cranks 132 and moves the corresponding plates 120 forwardly to position their projections 136 in the paths of dogs 38 and through the projection 136 just above the dog 138 adjacent the plates prevent further movement of the actuators. Engagement of the projections 44 of the dogs 38 with the projections 136 on the plates 120 through the dogs and spiders 46 positively throws the noses 53 of the dogs next ahead into the notch 23 of the plate 220 adjacent it. In this way the extents of movement of the counter wheels to zero positions serves to disconnect the driving disks 51 from the actuator gears 40 and control the differential movement of the latter. In total taking operations the transfer mechanism above described has no effect upon the counter wheels as the pinions 71 would not pass positions corresponding to the zero positions of the counter pinions, to trip their transfer pawls and if they did pass such positions they would not affect the pawls as the pinions 71 in total taking operations are engaged with the actuators and so far elevated that the transfer pawls would not extend in the paths of the pins on the pinions 71 to be tripped by them.

*Indicator mechanism.*—Indicators 145 loosely mounted on the shaft 12 near the top of the machine are adapted to be adjusted at each operation of the machine in accordance with the differential movement of the actuators. To this end the actuators are rigid with disks 146 at their side having three similarly shaped raised portions 147 on their side in which are cut cam grooves 148. Links 150 through slots 151 engage over and are guided by the drive shaft and these at their lower ends carry rollers 152 projecting into the planes of the cam grooves 148 and adapted to pass through these cam grooves as the disks are rotated.

The upper ends of the links 150 pivotally connect at 153 with the rear ends of floating indicator actuating segments 154 having gear teeth 155 in mesh with pinions 156 loose on the indicator shaft 12 but rigid with notched alining disks 157 and the indicators 145. The shaft 13 passes beneath the floating segments 154 and serves to prevent their undue movement in a downward direction. Shaft 14 rigidly carries indicator alining pawls 158 for engaging in notches 159 of the alining disks 157 for the indicators and preventing displacement of the latter after they have been adjusted. The alining pawls 158 have arcuate projections 160 beneath the shaft 14 and upon these are pivoted at 161 depending hooks 162, the lower portions of which are normally held forward by springs 163 connecting with rear tails of the hooks and with eyes on the rear portions of the arcuate projections 160. The springs 163 yieldingly permit rearward movement of the hooks but pins 164 project from the arcuate projections 160 in front of the pawls 162 and prevent their undue forward movement.

The hooks 162 are for coöperating with pins 165 on the side of the floating indicator segments. At the end of an operation of the machine the pins 165 are not located in the hooks 162 but instead the hooks are behind them, as shown in Fig. 1. The alining shaft 14 is, however, adapted to be rocked clockwise at the beginning of an operation of the machine through an arm 166 rigid with the shaft, pivoted at 167 to the upper end of a link 168 notched at 169 at its lower end to engage over and be guided by the drive shaft and having a roller 170 projecting from its side into a groove 171 at the side of cam 172 rigid with the drive shaft. The shape of the groove 171 is such that link 168 is elevated at the very beginning of an operation of the machine and is held in such position until the drive shaft rotates about 135 degrees when it is lowered. When the link 168 is elevated the alining pawls 158 are disconnected from the indicator disks 157 and the indicators are free to be adjusted. Also when the shaft 14 is rocked for disconnecting the alining pawls from the indicator disks the hooks 162 carried by these pawls are carried forward into the path of pins 165 on the indicator segments. The drawings show the segments for the indicators at zero position but the pins 165 of the indicator segments, before the beginning of the operation of the machine, are below the position shown in Fig. 1, and the rocking of the indicator alining shaft 14 carries the hooks 162 above the pin 165 of the indicator segments. The ends of hooks 162 are inclined and the pins 165 of the segments when the latter are raised will engage the inclines 173 of these hooks and force them rearward against the tension of their springs 163 until the pins 165 pass above them, when the springs 163 will serve to engage the hooks 162 beneath the pins 165. These pins 165 project from both sides of the segments 154 and at their ends back of the segments as shown in Fig. 1 they are supported by the lower ends of links 1655, the upper ends of which are loosely mounted on the indicator shaft 12. By this means of support the pins 165 are always the same distance from the indicator shaft to keep the segment teeth 155 in mesh with the pinions 156, yet the segments are free at times to be swung about their gear connections with the pinions as fulcrums.

The indicator alining shaft 14 with its pawls 158 and hooks 162 is rocked during the first ten degrees of movement of the drive shaft and during the next 50 degrees of movement of this shaft the indicator segments are raised to zero positions. This is done by means of cams 174 carried by arms 175 rigid with the drive shaft, the cam portions 176 of which during the time from the 10th to the 60th degrees of movement of the drive shaft are adapted to pass beneath rollers 152 of the indicator adjusting links 150 and by engaging their rollers move them upward to zero position which is that shown in the figures. The links 150 at the beginning of an operation of the machine will always be in completely depressed position as from the construction for adjusting the indicators hereinafter described, it will appear that the cam grooves 148 of the disks 146 always carry the rollers 152 of the indicator links 150 completely downward and leaves them there at the end of an operation. After the alining pawls 158 have been disengaged from the indicator alining disks 157 and the indicator segments are restored to the positions shown in Fig. 1 by the end of the first 60 degrees of movement of the drive shaft, the segments are adapted to be adjusted differentially by differential actuation of their corresponding actuators, the hooks 162 at such times serving as fulcrums for the segments.

It is at the end of 60 degrees of movement that the actuators start to rotate and at the same time, of course, the movement of the cam disks 146 for the indicators begins. The cam disks 146 being rigid with the actuators are moved differentially in accordance therewith and this movement of the disks 146 through the cam grooves 148 engaging rollers 152 carries these rollers with their links 150 downward differentially, correspondingly differentially oscillating the indicator segments 154 about their fulcrums 165 supported at this time by the hooks 162. As the differential movements of the actuators are completed the corresponding disks 146 stop movement and these remain still until the actuators are again picked up later on by the driving disks 51. When time for differential adjustments of the links 150 and indicator segment 154 has elapsed the indicator alining shaft 14 is rocked counter-clockwise to normal position to engage the alining pawls 158 with notches in the indicator alining disks 157 to lock the latter against movement. This locking movement of the indicator alining pawls also carries the hooks 162 from beneath the pins 165 of the indicator segments 154. Subsequent to this the actuators are picked up the second time by the driving disks 51 and moved farther to carry them into normal position for the next operation and during this further movement of the actuators the disks 146 rigid therewith are carried farther to cause their cam grooves 148 to carry the rollers 152 of the links 150 completely downward to their nine positions. This movement of the links 150 downward to their lowermost positions is permitted at this time since the hooks 162 no longer support the pins 165 of the segments 154 and allow these segments to roll idly about the indicator pinions 156 effecting no movement of the indicators. The links 150 are thus carried completely downward and are left at such positions till the beginning of the next operation of the machine in which by the end of the first 60 degrees of movement of the drive shaft they with their indicator segments are restored to zero positions by the cams 174 carried by the arms 175 rigid with the drive shaft.

*Operation.*—To operate the machine for indicating the amount of a transaction and entering the amount in the counter all that is necessary is to depress the proper amount keys and rotate the drive shaft D a complete rotation. The drive shaft may be rotated either by a crank suitably geared to it or by a motor which is also common in the art. Depression of the keys positions their ends in the paths of the dogs on the actuators. Rotation of the drive shaft rotates the disks 51 which at their 60th degree of movement pick up the dogs 38 of the actuators which have been released by swinging of the bell cranks 36 effected by depression of keys in their corresponding banks. The disks 51 then carry the actuators with them until the dogs 38 of the latter which originally engaged the bell cranks 36, engage the ends of depressed keys which disengage them from the disks 51 and allow the latter to rotate further independent of the actuators. During the movement of the actuators just referred to the counter pinions 70 are in mesh with them having been rocked in engagement with them at the beginning of the operation by the rocking of shaft 7 effected by cam 79 on the drive shaft. After time for the differential movement of the actuators has elapsed the counter is disengaged from the actuators and the depressed keys are released. The actuators are then subsequently again picked up by the disks 51 and moved into the position shown in the drawings in condition for the next operation.

After the counter is disengaged from the actuators the transfer plates 940 are moved rearwardly, successively to effect the necessary transfers and restore the tripped transfer pawls to untripped positions. At the beginning of the operation the plates 940 were moved forwardly to carry their pawls 920 in position for being tripped by their corresponding pinions 71.

At the beginning of an operation the indicator actuating links 150 are always in lowermost positions. The movement of the drive shaft between the 10th and 60th degrees is effective to restore them to their upper positions to engage the pins 165 of their corresponding segments in the hooks 162. Beginning with the 60th degree of movement of the drive shaft the actuators and their disks 146 are rotated and the differential movement of these actuators and disks which is always completed before the 135th degree of movement of the drive shaft, effects through the cam grooves 148 on the disks 146, the adjustment of the indicators in accordance with the movement of the actuators, the segments 154 for the indicators during this time being supported by the hooks 162 as fulcrums. The alining pawls for the indicators are disengaged from them at the beginning of an operation and reën- gaged with them as soon as the indicators are adjusted to hold them in adjusted position and to free the hooks 162 from the pins 165 of the indicator segments. After this the second movement of the actuators and disks 146 as they are being moved into condition for the next operation, is effective to move all of the links 150 to their lowermost positions.

In operating the machine for taking a total the total key only is depressed. This shifts the yoke 90 so that when the drive shaft is rotated the pinions 71 will be engaged with the actuators instead of the counter pinions 70 which engage with them in item entering operations. The engagement of the pinions 71 with the actuators results in the counter pinions 70 being reversely rotated by the actuators when the latter are moved. The depression of the total key releases all of the actuators by elevating their zero stops 36, and when the actuators are picked up by their disks 51 they will continue to rotate with them until stopped by their plates 120 being thrown forward to bring their projections 136 into the paths of the dogs 38 on the actuators. This movement of the plates 120 takes place whenever their corresponding counter pinions 70 pass from "one" to "zero", thereby engaging their pins 121 with the lower ends of the levers pivoted at 123 and moving the corresponding links 126 rearward and through them and the sleeves 127 the plates 120 forward. In this way the differential movement of the actuators in total taking operations is controlled by the movement of the counter pinions in moving reversely to zero positions. Aside from this different way of determining the differential movement of the actuators the operation of the machine in taking totals is substantially like that in entering items. In taking totals the indicators are adjusted to indicate the extents of movement through which their actuators have passed and these extents correspond to the extents of reverse rotation of the counter pinions in moving to zero. Thus the indicators at the end of a total taking operation will indicate the amount standing on the counter at the beginning of the operation.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination of a driving member having a constant movement in one direction only at each operation of the machine, a driven member, a driven means for differentially controlling the movement of the driven member effected by the driving member, a counter, means for operatively engaging the counter with the driven member before the latter is moved and disengaging it therefrom at the end of the differential movement, and means whereby the driving member thereafter actuates the driven member for moving the latter into position for the next operation.

2. In a machine of the class described, the combination of driving and driven members having movement in one direction only, means for coupling the members together for differential actuation of the driven member and uncoupling them at the end of the differential movement, and means for thereafter coupling the members together to position the driven member in condition for the next operation.

3. In a machine of the class described, the combination of a driving member having a constant movement in but one direction at each operation, a driven member also adapted for movement in but one direction, means for coupling the members together and later uncoupling them for determining differential actuation of the driven member by the driving member, and means whereby the members are again coupled to carry the driven member into position for the next operation and then uncoupled to permit the completion of the constant movement of the driving member.

4. In a machine of the class described, the combination of a driving member having a constant movement in but one direction at each operation, a driven member also having movement in but one direction, means for coupling the members together and later uncoupling them for determining the differential actuation of the driven member by the driving member, accounting mechanism, means for operatively connecting it with the driven member before the latter is differentially moved and disconnecting therefrom after said differential movement, and means whereby the driven member is again coupled with the driving member for movement thereby into position for the next operation, and then uncoupled therefrom to permit completion of the constant movement of the driving member.

5. In a machine of the class described, the combination of a driving member having a constant movement in but one direction at each operation, of a driven member having but one direction of movement, a counter engaged with the driven member during a part of the operation only, means for controlling the extent of movement of the driven member given by the driving member while the counter is engaged with the driven member, and means whereby the driving member gives the driven member an additional movement to position it for the next operation after the counter has been disengaged from the driven member.

6. In a machine of the class described, the combination of a driving member having a constant movement and in but one direction, at each operation, of a driven member actuated thereby and also movable in but one direction, accounting mechanism actuated by the driven member, means for disabling the driving connections between said members and at different times to permit operative disengagement of the driven member and the accounting mechanism whereby the accounting mechanism may be differentially actuated, and means for then enabling the driving connections to set the driven members in position for the next operation.

7. In a machine of the class described, the combination of a driving member having a constant movement and in but one direction, a driven member movable in but one direction by the driving member, normally inoperative means carried by the driven member for coupling it to the driving member, manipulative means for rendering the normally inoperative means operative and for temporarily differentially limiting the movement of the driven member and uncoupling said member from the driving member, accounting mechanism operable from the driven member during its differential movement only, and means for subsequently operating the manipulative means to release the coupling and permit the driven member to be again coupled with the driving member for movement thereby into position for the next operation.

8. In a machine of the class described, the combination of a notched driving member having but one direction of movement, of a driven member carrying dogs for coöperating with the notches, means for retaining the dogs ineffective in the normal condition of the machine, manipulative means for disabling the retaining means to permit the dogs engaging in the notches of the driving member and differentially limiting the movement of the driven member when moved by the driving member and uncoupling the dogs from the notches, accounting mechanism and means for operatively connecting and disconnecting the accounting mechanism and the driven member respectively before and after the differential movement of the latter, and means whereby the manipulative means are released after the operative disengagement of the accounting mechanism to permit the dogs again engaging the notches in the driving member whereby the driven member is again moved further by the driving member, into position for the next operation.

9. In a machine of the class described, the combination of driving and driven members both of which have forward movements only, said movements being of a constant extent at each operation, means for coupling said members together, accounting mechanism connected with the driven member, manipulative means for controlling differential temporary disconnection of said members, and means for disconnecting the accounting mechanism from the driven member while the latter is disconnected from the driving member.

10. In a machine of the class described, the combination of driving and driven members both having constant extents of movement at each operation and in but one direction, accounting mechanism and means whereby the constant movement of the driven member may actuate the accounting mechanism differentially.

11. In a machine of the class described, the combination of an actuator having a constant extent of movement at each operation in but one direction, totaling mechanism driven thereby, and means whereby the totaling mechanism may be disconnected from the actuator at different points of the latter's movement to accomplish differential actuation of the totalizing mechanism.

12. In a machine of the class described, the combination of a driving member having but one direction of movement and to the same extent at all operations, a driven member also having the same extent of movement for all operations and in but one direction, accounting mechanism operable from the driven member, means for temporarily stopping the movement of the driven member at various points in its movement, and means for operatively disconnecting the accounting mechanism from the driven member while the latter is temporarily stopped from rotation.

13. In a machine of the class described, the combination of an actuator having a constant extent of movement at each operation, totalizing mechanism directly engaged therewith, and means for disengaging the totalizing mechanism from the actuator at various points in the latter's movement to control the differential actuation of the former.

14. In a machine of the class described, the combination of a set of actuators having movement in but one direction, of counter pinions adapted to be engaged therewith, a second set of pinions always in mesh with the counter pinions, means for engaging the second set of pinions with the actuators whereby to reversely rotate the counter pinions to zero, and transfer mechanism for the counter pinions controlled by and effective through the second set of pinions.

15. In an accounting machine, the combination of a set of actuators having movement in but one direction, a frame having two sets of pinions always in mesh with each other, a movable arm pivotally carrying the frame intermediate the sets of pinions, means for moving the arm to carry the frame toward the actuators, and means for selectively stopping the movement of either of the sets of pinions before engaging the actuators to cause engagement of the other set with the actuators.

16. In a machine of the class described, the combination of a set of actuators, an arm having a constant movement at each operation, a frame pivoted to the arm, two sets of pinions carried by the frame on opposite sides of its pivot and constantly in mesh with each other, and means for selectively determining which of the sets is to be engaged with the actuators by movement of the frame.

17. In a machine of the class described, the combination of a set of actuators, a pivoted frame movable toward and from the actuators at each operation of the machine, a plurality of sets of pinions carried by the frame on opposite sides of its pivot and always in mesh with each other, and a member adapted selectively to limit the movement of either of the sets of pinions toward the actuators and by swinging the frame on its pivot to cause increased movement of the other set to engage its pinions with the actuators.

18. In an accounting mechanism, the combination of a set of actuators, a pivoted frame, a plurality of constantly meshed sets of pinions carried by the frame on opposite sides of its pivot, means for moving the pivot of the frame a constant distance toward and from the actuators at each operation, a yoke, and means for adjusting the yoke so as to limit the movement of either of the sets of pinions toward the actuators and by swinging the frame on its pivot insure the engagement of the other set with the actuators.

19. In a machine of the class described, the combination of a set of actuators having movement in but one direction, a pivoted frame, a plurality of constantly meshed sets of pinions carried by the frame on opposite sides of its pivot, means for moving the pivot of the frame a constant distance toward and from the actuators at each operation, an adjustable member normally in position to limit the movement toward the actuators of the portion of the frame carrying one set of pinions and to cause increased movement of the portion carrying the other set to engage them with the actuators, and manipulative mechanism for positioning the adjustable member so as to limit the movement of the other set of pinions and to free the normally limited set, whereby the latter when the machine is operated with the manipulative mechanism operated, will be engaged with the actuators.

20. In an accounting mechanism, the combination of a set of pinions, transfer mechanism therefor normally out of operative relation therewith, means for bringing the transfer mechanism into coöperative relation with the pinions at the beginning of an operation, means for differentially actuating the pinions while the transfer mechanisms are in coöperative relation therewith, and means for subsequently successively moving the transfer mechanisms to effect transfers and restore the transfer mechanisms to normal positions.

21. In an accounting machine, the combination of a set of pinions, a set of plates normally remote from the pinions but movable at the beginning of an operation adjacent the pinions, pawls carried by the plates adapted to be tripped as their pinions pass from "nine" to "zero" positions to position their tails adjacent the next higher totalizer pinions, a set of actuators for the pinions, means for lowering the pinions after actuations by the actuators so as to position the tails of the tripped transfer pawls behind teeth of their adjacent pinions, and means for subsequently and successively moving the plates and these pawls away from their pinions to normal position and through the tails of the tripped pawls, their connected pinions one step.

22. In a machine of the class described, the combination of a set of pinions, means for differentially actuating the same, a series of plates, pawls carried by the plates adapted to be engaged and tripped as their corresponding pinions pass from "nine" to "zero" to carry their tails into positions for subsequent coöperation with the next higher pinions, means for moving the plates with their pawls to actuate the pinions in coöperative relation with the tails of tripped pawls, to actuate such pinions additional steps, and restoring mechanism operated by the final movement of the plates to restore the tripped pawls to normal position.

23. In a machine of the class described, the combination of counter mechanism including a plurality of sets of constantly meshed pinions, a single set of actuators for the pinions adapted to be engaged by either of them, transfer mechanism for the counter mechanism coöperating with one of the sets of pinions, turn to zero mechanism coöperating with the other set, and means for engaging either set of pinions with the actuators accompanied by the operative disengagement of their pinions with their associated transfer or turn to zero mechanism.

24. In a machine of the class described, the combination with a totalizer, of actuators therefor having constant extents of movement at each operation and in but one direction, and devices whereby the totalizer may be set at zero by said movement of the actuators.

25. In a machine of the class described, the combination with a totalizer, of actuators therefor having movement in but one direction, and manipulatively controlled devices whereby the totalizer may be set at zero by the movement of the actuators.

26. In a machine of the class described, the combination of a set of counter pinions, a set of actuators therefor having movement in but one direction and to constant extents at all operations, and means for connecting the counter pinions with the actuators either for adding on the counters or turning them reversely to zero.

27. In a machine of the class described, the combination of a set of counter pinions, actuators therefor having constant extents of movement and in but one direction, means normally effective to engage the pinions with the actuators for adding operations, manipulative means, and connections controlled by said manipulative means for connecting the pinions with the actuators so that the latter will move the former in a direction reverse to that of adding.

28. In a machine of the class described, the combination of a set of counter pinions, actuators therefor having movement in but one direction, and means for connecting the pinions with the actuators either for movement forwardly or reversely by the latter.

29. In a machine of the class described, the combination of a set of actuators having but one direction of movement, a set of counter pinions, connections for rotating the counter pinions reversely to zero positions, a set of projection carrying plates, levers adapted to be positoined so as to be engaged by the counter pinions when the latter approach their zero positions, and connections between the levers and the projection carrying plates whereby when the levers are moved by the counter pinions reaching zero position, the corresponding plates are moved to carry their projections into the path of the actuators to stop the movement of the latter.

30. In a machine of the class described, the combination of a set of actuators, a set of counter pinions, means for turning the latter to zero, levers positioned in the paths of the counter pinions when the latter are in position for turn to zero operations, and connections whereby the layers, when swung by their counter pinions reaching zero, prevent further turning of the pinions.

31. In a machine of the class described, the combination of a set of actuators, a set of counter pinions, means for operating the pinions reversely by the actuators, a set of levers normally out of the paths of the counter pinions, means for moving the levers into the paths of the pinions when in turn to zero position, at each operation of the machine, and connections whereby said movement of the levers when their counter pinions are at zero and whereby rotation of the pinions to zero after the levers have been positioned in their paths, serve to prevent further movement of their corresponding actuators.

32. In a machine of the class described, the combination of a set of actuators, a set of counter pinions, connections for actuating the pinions reversely from the actuators for turning the pinions to zero, a shaft, arms carried thereby, levers pivotally carried intermediate their ends, by the arms, stop members corresponding in number with the arms for coöperating with the actuators, connections from one end of the levers to the stop members, and means for rocking the shaft to carry the free ends of the levers into the paths of the counter pinions so as to in case the pinions stand at zero, by swinging the levers in their pivots, actuate the connections with the stop members to move the latter into the path of the actuators or if the pinions are not at zero position the levers in their paths so that when they approach zero positions they will swing the levers about their pivots and through the connections of their other ends with the stop members move the latter into engagement with the actuators to stop their movement.

33. In a machine of the class described, the combination of a set of actuators, a set of counter pinions, connections whereby the actuators can turn the pinions reversely to zero positions, limiting means for the actuators, a set of levers for the limiting means, projections on the pinions adapted to engage the levers at zero positions when the levers are in their paths of movement, and means for positioning the levers in such paths of movement of the projections on the pinions effective when a pinion is already at zero to actuate its lever and through it its limiting means to prevent movement of the actuator.

34. In a machine of the class described, the combination of a set of driving members, of a set of driven members carrying normally inoperative dogs for connecting them with the driving members, a counter, manipulative means for connecting the counter with the driven members for turn to zero operations, also effective to render the dogs operative, a set of plates carrying projections adapted to be positioned in the paths of the dogs, and connections whereby the plates are moved to carry their projections into the paths of the dogs on the driven members to disconnect the latter from their driving members when the pinions are in zero positions.

35. In a machine of the class described, the combination with accounting mechanism, of an actuator having movement in but one direction and to a constant extent at all operations, for actuating the accounting mechanism differentially.

36. In a machine of the class described, the combination of accounting mechanism, actuating mechanism therefor having a constant movement at all operations, means whereby the constant movement of the actuating mechanism effects differential movement of the accounting mechanism, and means for restoring the actuating mechanism before the beginning of its next actuating movement.

37. In a machine of the class described, the combination with a driving member having a constant extent of movement in one direction only at each operation, of a driven member actuated thereby, said driven member being driven at each operation to two differential movements combining to make a total movement of invariable extent, and means for controlling the relative extents of the two differential movements.

38. In a machine of the class described, the combination with a driving member having a constant extent of movement in one direction only at each operation, of a driven member actuated thereby, said driven member being given at each operation two actuations of different extents but combining to make a total movement of invariable extent, and manipulative means for predetermining the relative extents of the two differential movements.

39. In a machine of the class described, the combination with a driving member having a constant extent of movement in one direction only, of a driven member actuated thereby, said driven member being given at each operation two actuations of different extents but combined making a total movement of invariable extent, manipulative means for determining the relative extents of the two differential movements, a totalizer, and means for connecting the totalizer and the driven member during one of the differential movements of said member.

40. In a machine of the class described, the combination with driving members having an invariable extent of movement in one direction only, of actuators driven thereby having a total movement of invariable extent at each operation, totalizing devices, means for connecting and disconnecting the actuators and the totalizer, means for arresting the actuators at different points in their invariable movement whereby to differentially actuate the totalizer, means for disabling the arresting means to permit the actuators to complete their movements, the totalizer and the actuators being disconnected before the actuators resume their movements.

41. In a machine of the class described, the combination with actuators having invariable extents of movement at each operation and in but one direction, a totalizer, means for connecting and disconnecting the totalizer and the actuators, said means operating to establish the connection before the actuators start to move, means for arresting the actuators at different points in their movement and holding them stationary until the totalizer and the actuators are disconnected, thereby causing differential actuation of the totalizer and permitting the actuators to complete their movement without affecting the totalizer.

42. In a machine of the class described, the combination with an actuator movable in one direction only, a means for imparting two differential movements to said actuator, the two movements combined making a total movement of invariable extent at each operation, a totalizer element, and means for connecting the totalizer element and the actuator during one of the differential movements of the latter and disconnecting them during the other differential movement.

43. In a machine of the class described, the combination with an actuator having a constant extent of movement at each operation and in but one direction, a totalizer element, means for connecting the totalizer element with the actuator whereby to set the former at zero by the movement of the latter, and means for disconnecting the totalizer element from the actuator when said element completes its zero setting movement, thereby permitting the actuator to complete its constant movement without affecting the totalizer element.

44. In a machine of the class described, the combination with a counter pinion, of an actuator therefor having movement in but one direction and to an invariable extent at each operation, means operable to connect and disconnect the totalizer pinion with the actuator whereby to set the former at zero by the movements of the latter, means for arresting the actuator when the pinion reaches zero and holding it stationary until the pinion is disconnected therefrom, and means for then disabling the arresting means to permit the actuator to complete its movement.

In testimony whereof I affix my signature in the presence of two witnesses.

HAAKON A. MARTIN.

Witnesses:
 Roy C. Glass,
 Carl Beust.

It is hereby certified that in Letters Patent No. 1,189,278, granted July 4, 1916, upon the application of Haakon A. Martin, of Dayton, Ohio, for an improvement in "Cash-Registers," errors appear in the printed specification requiring correction as follows: Page 11, lines 90 and 91–92, for the word "totaling" read *totalizing;* page 12, line 92, for the word "actuations" read *actuation;* same page, line 104, for the word "as" read *by;* line 105, after the word "pinions" insert the words *as said pinions;* line 106, for the word "their" read *the,* and same line, after the word "tails" insert the words *of the pawls;* page 13, line 57, claim 30, for the word "layers" read *levers;* page 14, line 22, claim 37, for the word "driven" read *given,* and same line, strike out the word "to"; same page, line 84, claim 42, before the word "means" strike out the article "a"; and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 235—9.